(12) United States Patent
Sharma

(10) Patent No.: US 7,103,672 B1
(45) Date of Patent: Sep. 5, 2006

(54) METHOD AND APPARATUS FOR IMPROVING SYSTEM PERFORMANCE THROUGH REMOTE CREDIT MANAGEMENT

(75) Inventor: Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/562,308

(22) Filed: May 1, 2000

(51) Int. Cl.
G06F 15/16 (2006.01)
G06F 15/173 (2006.01)

(52) U.S. Cl. .................. 709/232; 709/226; 370/232; 370/235

(58) Field of Classification Search .......... 709/230, 709/231, 232, 234, 237, 235, 236, 223, 224, 709/225, 226; 370/236, 395.7, 412; 710/29, 710/240
See application file for complete search history.

(56) References Cited

U.S. PATENT DOCUMENTS

| | | | | |
|---|---|---|---|---|
| 5,483,526 A | * | 1/1996 | Ben-Nun et al. | 370/395.7 |
| 5,825,748 A | * | 10/1998 | Barkey et al. | 370/236 |
| 5,850,399 A | * | 12/1998 | Ganmukhi et al. | 370/412 |
| 6,044,406 A | * | 3/2000 | Barkey et al. | 709/235 |
| 6,256,674 B1 | * | 7/2001 | Manning et al. | 709/232 |
| 6,289,386 B1 | * | 9/2001 | Vangemert | 709/232 |
| 6,631,428 B1 | * | 10/2003 | Sharma et al. | 710/29 |
| 2004/0083321 A1 | * | 4/2004 | McAllister | 710/240 |

* cited by examiner

*Primary Examiner*—Paul H. Kang (57) ABSTRACT

A method and apparatus are disclosed for improving system performance by controlling the flow of transactions between interconnected nodes by considering the system resources required for a transaction response when determining whether to send a transaction. The system uses a debit system for tracking the space consumed by pending transactions between nodes within a particular flow-control class. The system allocates a certain maximum number of debits to a flow-control class. Each time a transaction is sent, a number of debits required to respond to the transaction is computed and added to a debit register. When the debit register reaches the maximum number of debits allocated to it, no more transactions are sent. As transaction responses are completed, the debit register balance is decreased to reflect that more space within the flow-control class for debits is available, such that new transactions might be processed.

20 Claims, 6 Drawing Sheets

METHOD AND APPARATUS FOR IMPROVING SYSTEM PERFORMANCE THROUGH REMOTE CREDIT MANAGEMENT

FIELD

The technical field relates generally to computer and network architecture and more particularly, but not by way of limitation, to a method and apparatus for improving system performance by remote credit management.

BACKGROUND

In a system having multiple, interconnected nodes, credits are often used to proactively control the flow of transactions. In this approach, if two nodes A and B are connected, A maintains a certain number of credits for B in each flow-control class in which it can send a transaction to B. Each transaction sent from A to B enters a first-in, first-out (FIFO) structure belonging to the flow-control class for that transaction. Thus, A maintains the amount of available space for B in each flow-control class in which it can send a transaction to B. A flow-control class may consist of instructions of a particular type. For example, a class may consist of "read" requests in which the requesting node sends a memory address to the receiving node and the receiving node retrieves the data from memory and sends the data as a response to the requesting node.

When A sends a transaction to B in a particular flow-control class (e.g., class F), a credit system decrements the amount of available credits of class F for B by the amount reflecting the amount of FIFO storage that will be consumed in B for node A. When node B consumes the transaction, it releases those credits back to A. In the "read" example above, the requesting node may have 100 credits initially allotted for the "read" class, and a single read request might require 2 credits. Under existing credit systems, the available balance for the "read" class credits will decrease by two each time a request is made. The destination node will release the credits back to the sender as it removes the transaction from its queue. The released credits for each flow control class travel back to the sender A from receiver B either through a special transaction or as part of normal transactions that B sends to A. It should be noted that different transactions in the same flow control class may need different credits. The sender sends a transaction if it has enough credits needed for that transaction.

It may be noted that node A may have to keep track of credits for other nodes if node A is directly connected to those nodes. For example, in a multi-processor system, the nodes may be different interconnect chipsets such as the memory controller, the I/O controller, the cross-bar, etc. The various flow-control classes may be used for transactions such as to obtain a cache line, data return from memory, coherency responses from the various caches, etc. Some systems may not employ a proactive credit-based flow-control mechanism, but instead may adopt a separate signal from the destination node requesting the sender to stop transmitting any new transactions. The proposed scheme should work for the signaling way of flow control as well.

While the credit-based scheme, or the reactive flow-control scheme, guarantees that a transaction does not get dropped due to a lack of FIFO space in the destination node, they do not guarantee that access requests from one node do not slow down traffic in the entire system. Existing credit systems only consider the amount of space required by a transaction in the destination node and do not consider the amount of space required if the transaction needs a response. For example, a system may include a cross-bar chip connected to a cache coherent host I/O bridge. The cross-bar chip may also be connected to a memory controller, some CPU chips, other host I/O bridges, and connections to other cross-bars if a bigger system is used. The host I/O bridge may serve one or more I/O buses, each of which may contain one or more I/O devices. It is conceivable that if a lot of I/O devices are actively doing direct memory access (DMA) and the cache is pre-fetching deep for each DMA read request, many cache line read requests may go to the system. A DMA read request will enter the read request queue in the cross-bar chip. The read request will then be forwarded to the system memory controller or other caches, or some other system memory controller, if they hold the data. The requested entity subsequently provides the data to the cross-bar chip. This data enters the data return queue in the cross-bar and is eventually returned to the host I/O bridge that requested the data as a data return transaction in a different flow control class.

Typically, data return requires many more cycles than a read request. If requests from the host bridge arrive at a fast pace, the data returning to the host bridge will be queued in the cross-bar chip. This may create a situation in which the data return queue in the cross-bar chip is full due to multiple pending data returns to the host bridge. When this happens, the traffic to other parts of the system also stalls because the data return queue in the cross-bar is a shared resource. The problem arises because an entity such as the host I/O bridge can make requests at a rate at which it cannot sustain the resultant data return. Even though the host bridge may possess the credits to make the read requests, it does not have enough bandwidth to process the data returns at the rate at which it can make read requests. This causes a backlog of data return traffic in the system and slows down the entire system. Thus, a greedy agent can lower the entire system's performance. Existing strategies do not provide any safeguards against this kind of performance bottleneck. What is needed is a system that prevents a single requesting agent from slowing the system. In particular what is needed is a system that considers the effects of pending transactions on the system when it decides whether or not to initiate a new transaction.

SUMMARY

A method and apparatus are disclosed for improving system performance by controlling the flow of transactions between interconnected nodes by considering the system resources required for a transaction response when determining whether to send a transaction. The system uses a debit system for tracking the space consumed by responses to pending transactions in the intermediate nodes in the respective return flow-control class. The system allocates a certain maximum number of debits to a flow-control class. Each time a transaction is sent, a number of debits required by the response to the transaction is computed and added to a debit register. When the debit register reaches the maximum number of debits allocated to it, no more transactions are sent. As transaction responses arrive at the requesting node, the debit register balance is decreased to reflect that more space within the flow-control class for debits is available, such that new transactions might be processed.

DETAILED DESCRIPTION

The system avoids the bottleneck created by pending transaction responses by monitoring the space consumed by both the pending requests and their corresponding responses. That is, the system uses two types of credits to monitor not only the amount of space required for a transaction request, but also the space required for a response to the transaction in the remote nodes that will carry the response. The system must have sufficient credits for both the request and the response in order to process a transaction.

In a system having multiple nodes, each requesting agent, or node, is allocated a certain amount of space (max_response) for its response to all pending transactions within a certain flow-control class in another node(s). If a requesting transaction requires a response, the transaction response size (that is, the number of entries it will consume in a response queue, held in a first-in, first-out (FIFO) format) is precomputed and added to the space that is already used, or will be used, by all other pending responses from that node within the request flow-control class. The value of the space consumed by responses to pending transactions is stored in a debit register, also referred to as the debit_response value. When debit register value equals or exceeds max_response, no new transaction requests are sent to the destination, even though sufficient request credits may exist. This reflects a state in which too many requests are pending, and any more requests could overwhelm the destination node and slow down the system.

When a response transaction is received, the requesting node decrements its debit register value by the number of FIFO entries it consumed in the destination node to reflect that fewer transactions are pending. It may be noted that this number will be equal to the number that was added when the corresponding request transaction was sent. Significantly, this additional flow-control restriction may be selectively imposed on certain nodes, or only on selected classes of transactions, if desired. For example, a system designer may choose to impose this restriction on connections between the host I/O bridge 50 and the remote cross-bar 40 only, and might make no such restrictions on processors 70, 71, 72, 73, or memory controllers, e.g., 60. The host I/O bridge 50 may be more likely to generate more requests because it may serve many slow I/O devices and the system bus to host bridge interconnect bandwidth may be low. Thus, it may need this sort of extra flow-control to guarantee a smooth operation in the rest of the system 30. On the other hand, the CPU 70 has a much higher execution rate and may not be bottlenecked by its interconnect traffic. Thus, it might not need this kind of flow control mechanism to throttle its requests. Another example where we do not need this extra flow-control mechanism is the response type of flow-control class, because they will not generate any further responses directly.

Figure 1:
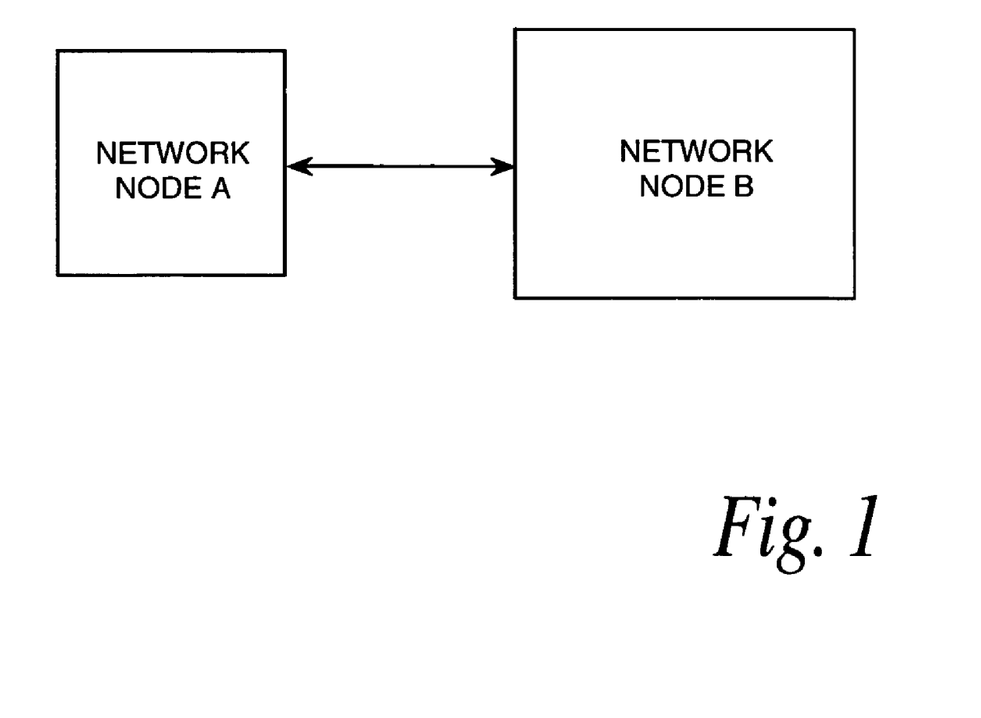
FIG. 1 is a block diagram of a simple system having two interconnected nodes.
Figure 2:
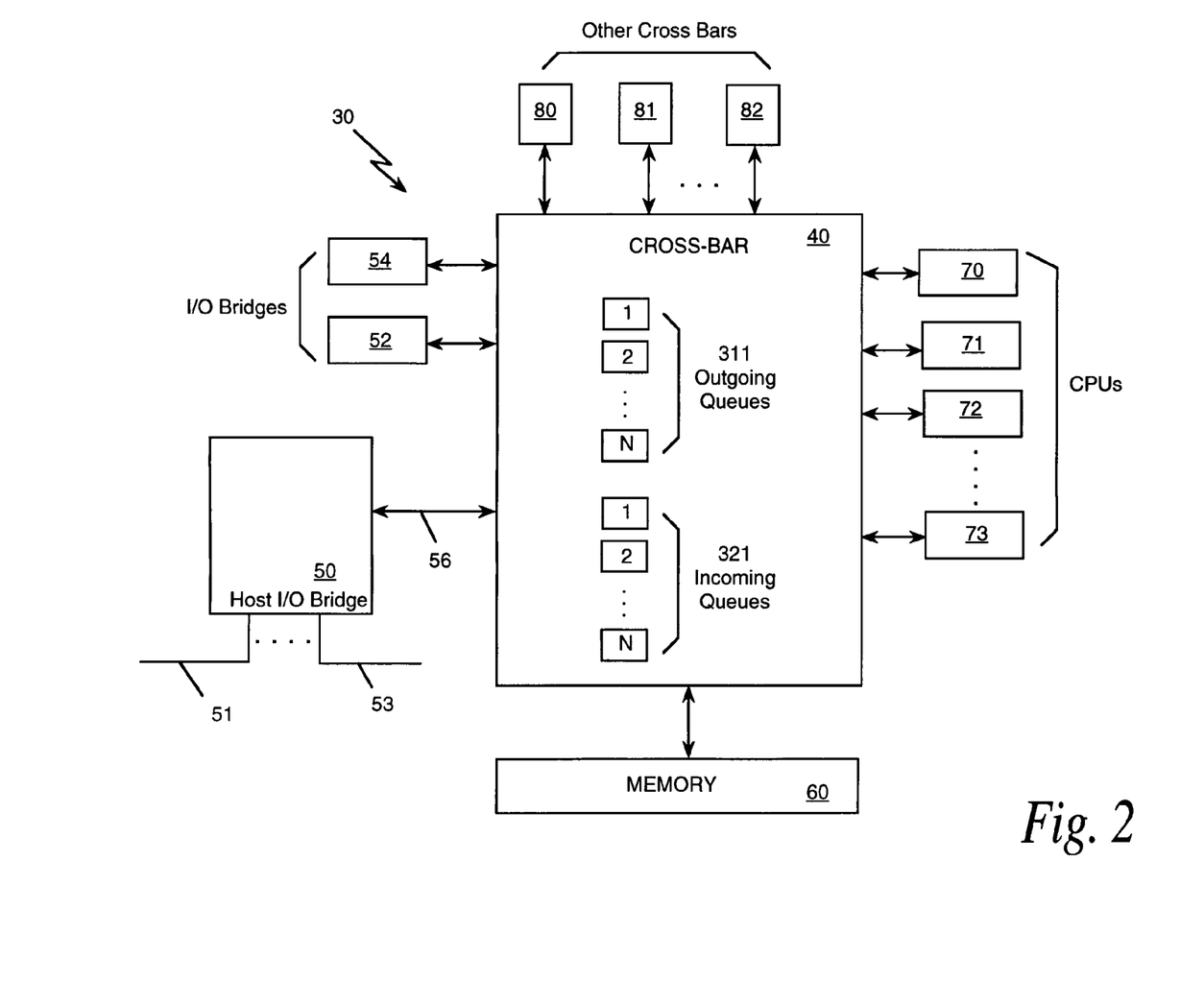
FIG. 2 is a block diagram system having multiple interconnected nodes.

FIG. 1 shows a simple system having two interconnected nodes, A and B. FIG. 2 shows a more complicated system 30 having a cross-bar chip 40. The cross-bar 40 is connected to various nodes, such as CPUs 70, 71, 72, 73, and a memory controller 60. The cross-bar 40 is also connected to various I/O bridges 50, 52, 54 through interconnect structures, e.g., 56. Also, the cross-bar 40 is connected to other cross-bars or other interconnects in a large system 80, 81, 82. Each interconnected element is referred to as a node.

In FIG. 2, the host I/O bridge 50 is connected to I/O busses 51,53, and is also connected to the cross-bar 40 through the interconnect structure 56. The host I/O bridge 50 may send a request transaction to the cross-bar 40. For instance, the host I/O bridge 50 may send a request that the cross-bar 40 retrieve data from the memory controller 60. To manage these requests and responses across the interconnect structure 56 between the host I/O bridge 50 and the cross-bar 40, the cross-bar 40 includes multiple incoming queues 321 and outgoing queues 311.

The method essentially allocates each requesting entity a portion of the destination nodes response FIFO. It is not necessary that these fractions add up to 1. Designers may take advantage of the fact that not all responses for all the outstanding requests may be queued simultaneously and give themselves more leeway in allocating the fractions that may add up to more than 1. Also, designers may decide not to impose this extra flow control restriction on well-behaved agents.

Figure 3:
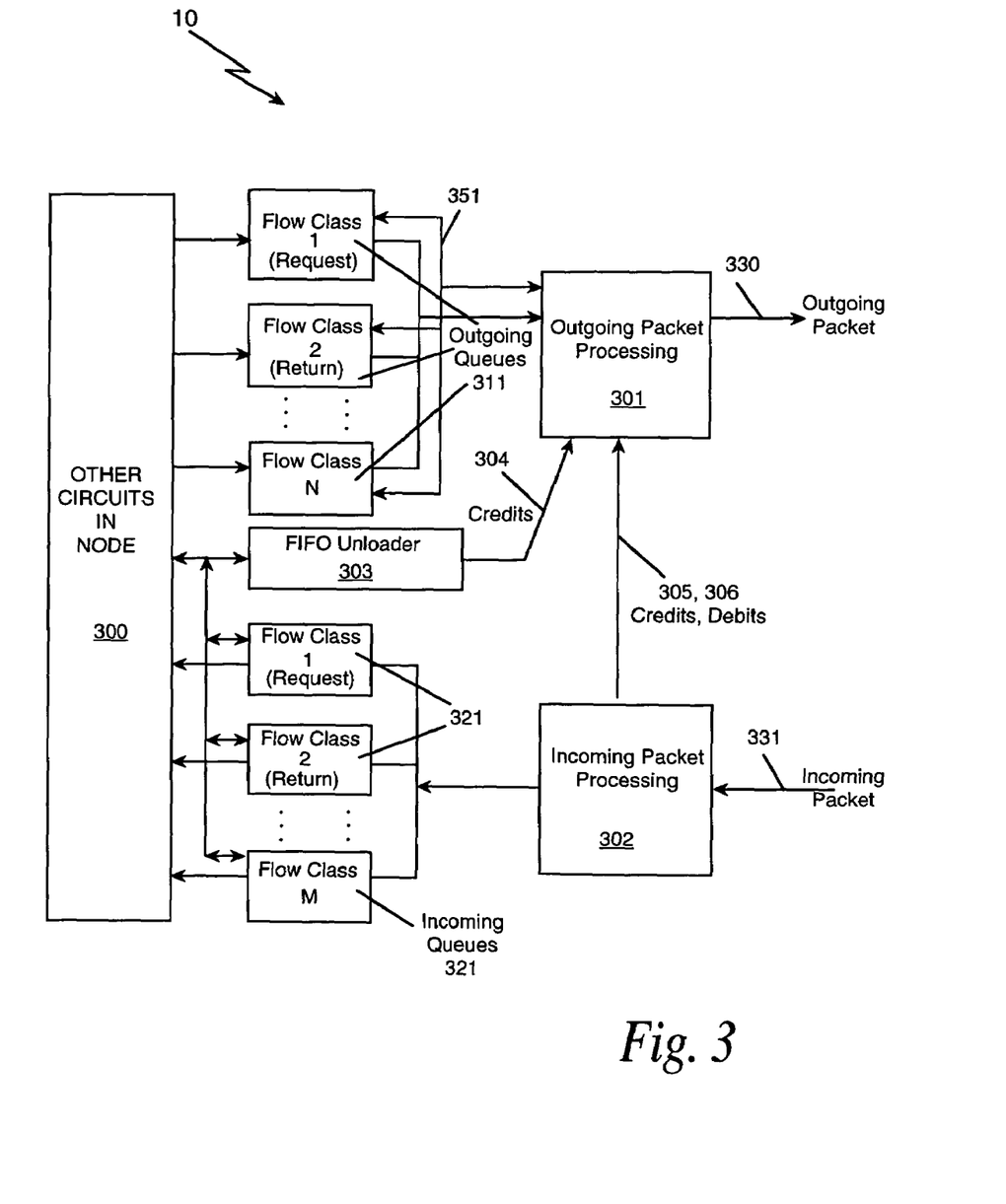
FIG. 3 is a more detailed block diagram of the system of FIG. 2.

FIG. 3 shows a more detailed block diagram of a node of a system 10. All of the packets from a plurality of circuits 300 in a node send packets to a plurality of outgoing queues 311 (numbered individually 1–N) and receive data from a plurality of incoming queues 321 (numbered individually 1–M). The number of incoming and outgoing queues may be different, thus the different variables N and M are used. Each incoming and outgoing queue 311,321 represents a flow-control class and in each node. For example, the outgoing queue 311 in flow-control class 1 for node A 300 may be a request queue, and the outgoing queue 311 for flow-control class 2 may be a return queue. The outgoing queues 311 send data to the outgoing packet processing unit 301, which sends an outgoing packet 330 of data to a connected node.

On the incoming side, the process is similar. The incoming processing unit 302 receives an incoming packet 331 of data from a connected node and delivers that data to the appropriate incoming queue 321 for the particular flow-control class to which the 8 packet belongs. For example, an incoming packet in the return class may be in flow-control class 2, in which case the incoming packet processing unit 302 will deliver that data to the incoming queue 321 for flow-control class 2.

FIG. 3 also shows the flow of debits and credits in the system 10. The system 10 uses credits and debits to control the flow of data. Credits correspond to the amount of space required to send a particular transaction. Debits correspond to the amount of space required to return the response, if any, to a particular transaction in a remote node. Credits and debits may be maintained for every node and in every flow-control class, if desired. In FIG. 3, for example, the outgoing packet processing unit 301 determines whether a particular flow-control class has sufficient debits and credits to perform a transaction. Each flow-control class has an initial allocation of debits and credits, which change with the issuance of every transaction. As transactions are completed, and returned to the incoming packet processing unit 302, credits are released by the neighboring node 305. The credits that have been released by a neighboring node 305 are received by the incoming packet processing unit 302 and sent to the outgoing packet processing unit 301, along with debit responses for received return transactions 306.

Once a packet is loaded to an outgoing queue 311, the queue control logic arbitrates for the transaction to which the packet belongs. The arbitration request is conveyed through control lines 351. The outgoing packet processing unit 301 then allows the transaction to proceed if all conditions are met by requesting the FIFO to unload through control lines 351.

The debits 306 and credits 305 sent from the incoming packet processing unit 302 to the outgoing packet processing unit 301 are the credits and debits used by the outgoing packet processing unit 301 to control the flow of outgoing transactions for the node shown in FIG. 3. FIG. 3 also shows a second set of credits 304 flowing into the outgoing packet processing unit 301. These credits are used to control the flow of incoming transactions from a neighboring node, e.g., node B in FIG. 1. When data packets are removed from an incoming queue 321, the credits are released back to the neighboring node that sent the transaction. This is done by the FIFO unloader 303, which then sends the credits 304 to the outgoing packet processing unit 301 as it unloads packets from an 9 incoming queue 321. These credits that are released to a neighboring node 304 are not used to control outgoing transactions in the node shown in FIG. 3, but instead are returned to the neighboring node in an outgoing data packet 330, or other means. When the credits released back to a neighboring node 304 are received by the neighboring node, they might be received as an incoming packet processing unit 302' and sent to an outgoing packet processing unit 301' similar to the process shown in FIG. 3 for returning credits 305.

Figure 4:
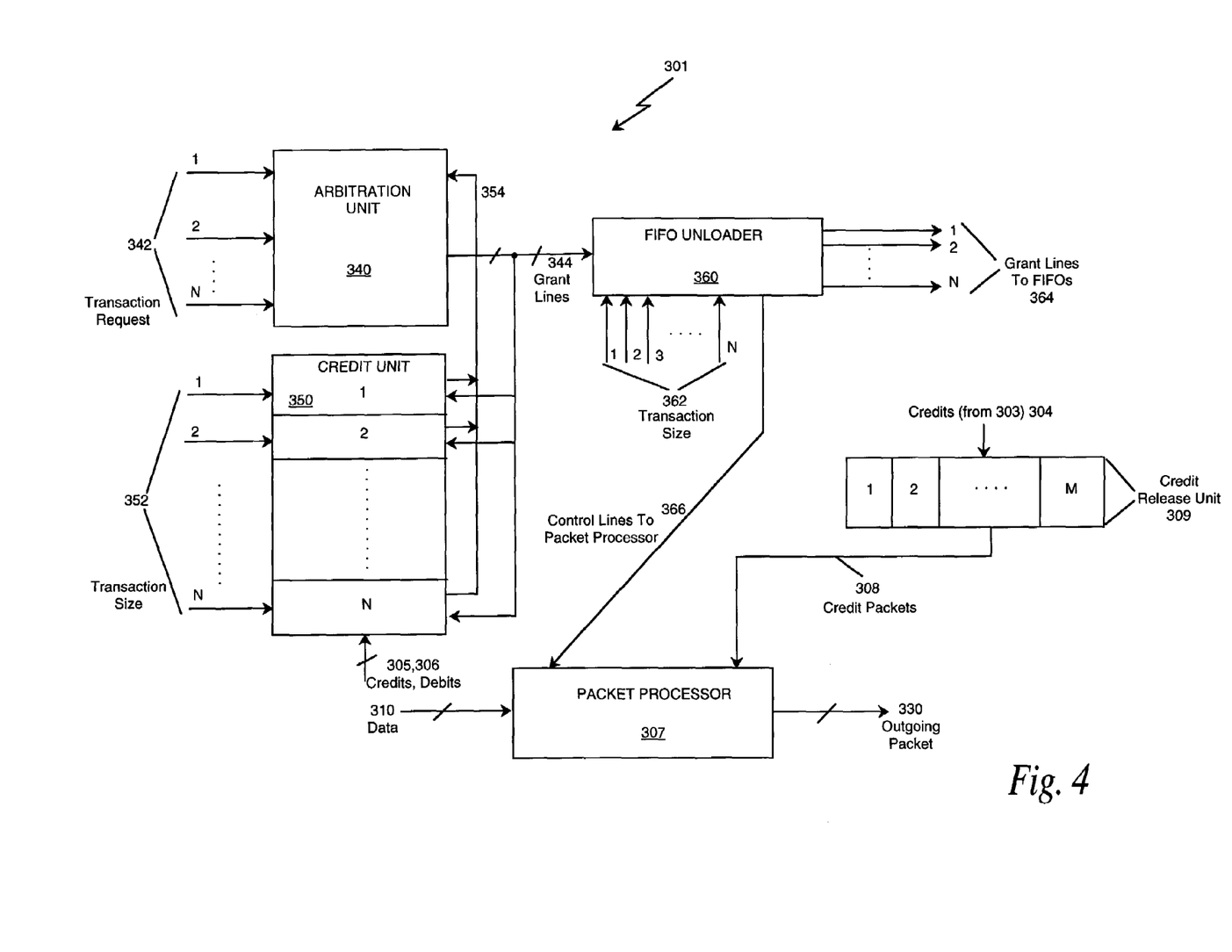
FIG. 4 is a more detailed block diagram of the system of FIG. 5.

FIG. 4 shows a more detailed block diagram of the outgoing processing unit 301. The packet processor unit 307 receives data 310 from the outgoing queues 311 and outputs an outgoing data packet 330. As packets from a neighboring node are unloaded to other circuits in the node 300 by the FIFO unloader (303 in FIG. 3), the credits that represent the freed space in the inbound queues 321 are sent to a credit release unit 309. The credit release unit 309 holds the credits 304 until the packet processor 307 decides to release some or all of the credits back to the neighboring node. The credits 304 may be grouped or bundled into packets 308 to be sent separately or along with data packets to the neighboring node as outgoing data 330.

FIG. 4 also shows the FIFO unloader 360 controlling whether a particular transaction may proceed with control lines 366 to packet processor 307. The outgoing FIFO unloader 360 receives inputs from an arbitration unit 340 and inputs corresponding to transaction sizes 362 from the outgoing queues 311 through control wires 351. The arbitration unit 340 receives transaction requests 342 from outgoing queues 311 through control wires 351 and determines which transactions will proceed. To make this determination, the arbitration unit 340 also receives an input from entries (1–N) in a credit unit 350. These credit unit entries 350 maintain the credit and debit balances for the flow-control class they represent for a particular node. Also, the credit unit receives credits and debits that have been released from a neighboring node 305,306. To determine whether a particular transaction has sufficient credits and debits to proceed, the transaction size 352 is input into the credit unit 350 from control lines 351. Using this information, the arbitration unit 340 sends transaction grant lines 344 to the outgoing FIFO unloader 360 and to the credit unit 350. The credit unit 350 uses this signal to adjust the credits and debits in the appropriate entry. The FIFO unloader 360 uses the grant lines 344 to unload all the data for the transaction from the corresponding outbound queue 311. It uses the corresponding transaction size to unload the outbound queue 311 for the number of cycles needed and sends control signals 366 to the packet processor to make packets for the transaction that won arbitration.

Figure 5:
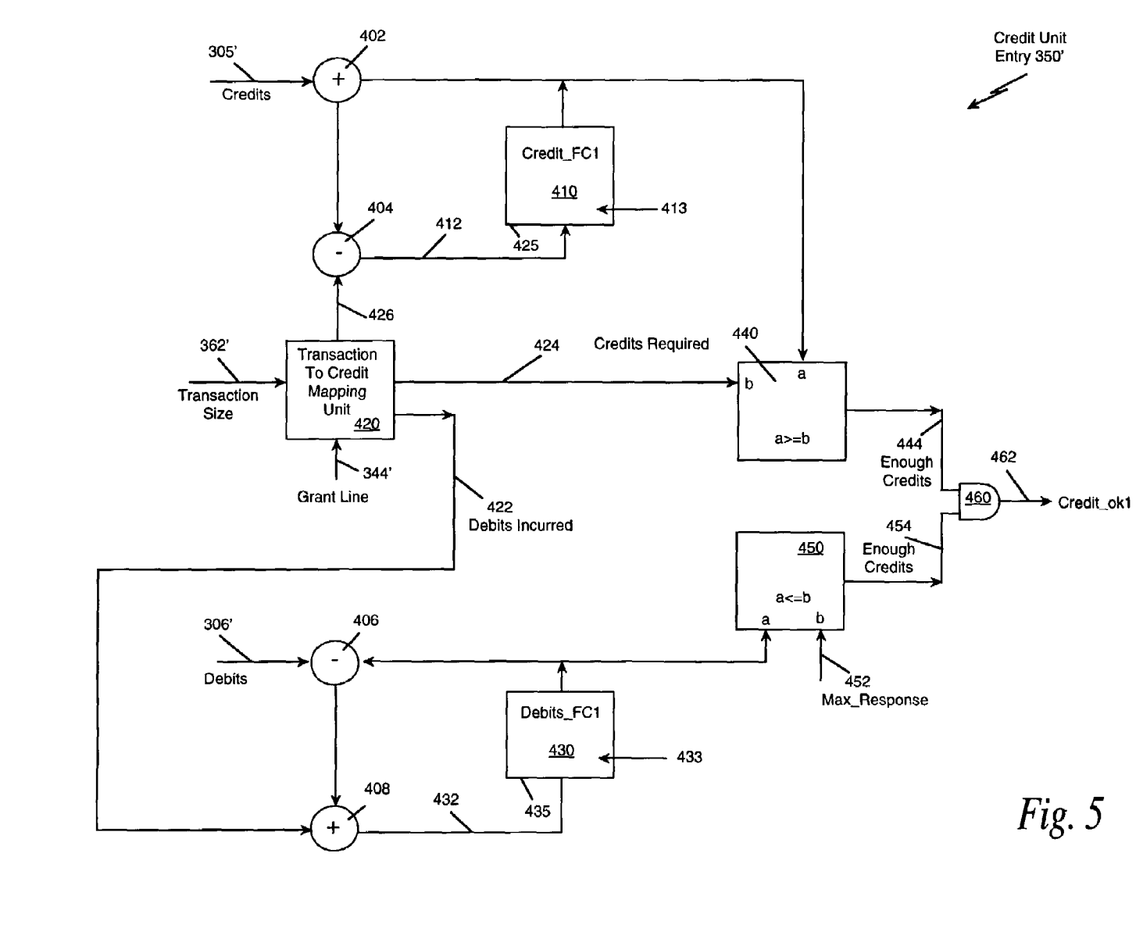
FIG. 5 is a block diagram of the hardware used by the system.

FIG. 5 shows a block diagram of the control logic for one particular flow-control class's credit unit entry for one node, that determines whether or not a new transaction may be processed. The system has a credit register (credit_FC1) 410 and a debit register (debits_FC1) 430, which maintain the current debit and credit balances for the flow-control class. Each of these registers 410, 430 may have a clock 413, 433 and a reset input 425, 435. In one implementation, the credit register 410 may be initialized to a predetermined value (e.g., 100 credits) and the debit register 430 may be initialized to zero debits. As incoming credits 305 are released back due to return transactions, those credits in the particular flow-control class 305' are added by an adder 402 to the credit register using an adder 402. Similarly, as incoming debits 306 are released back to the outgoing unit by the neighboring node, those debits are in the particular flow control class 306' are subtracted by a subtracting unit 406 from the balance in the debit register 430.

New transaction requests are processed by the transaction to credit response mapping unit 420. The mapping unit 420 receives inputs from the grant line 344' and the transaction size 362' corresponding to the particular flow-control class. The credits required for a transaction 424 are sent to a credit comparator 440 as the "b" input. The "a" input to the credit comparator 440 is the current credit register 410 balance. If the credit register 410 balance is greater than or equal to the credits required for the transaction 424, then the comparator sends an "enough credits" signal 444 to an AND gate 460. The other input to the AND gate 460 is the "enough debits" output 454 of a debit comparator 450. The debit comparator 450 compares a maximum debit value 452 ("max_response") (the "b" input) to the current balance in the debit register 430 (the "a" input. If the current balance in the debit response register 430 is less than or equal to max_response 452, then the "enough debits" signal is high. When both the "enough credits" 444 and "enough debits" 454 signals are high, the output of the AND gate 460 (the "credit_ok1") output indicates that the transaction may proceed.

When a transaction request is granted, the mapping unit 420 also sends the number of credits consumed 426 by the transaction to a subtractor 404, which subtracts the consumed credits 426 from the balance in the credit register 410. As also shown in FIG. 5, if a transaction request is granted, the mapping unit 420 also sends the number of debits incurred 422 to an adder 408, which adds the debits consumed to the debit balance.

Figure 6:
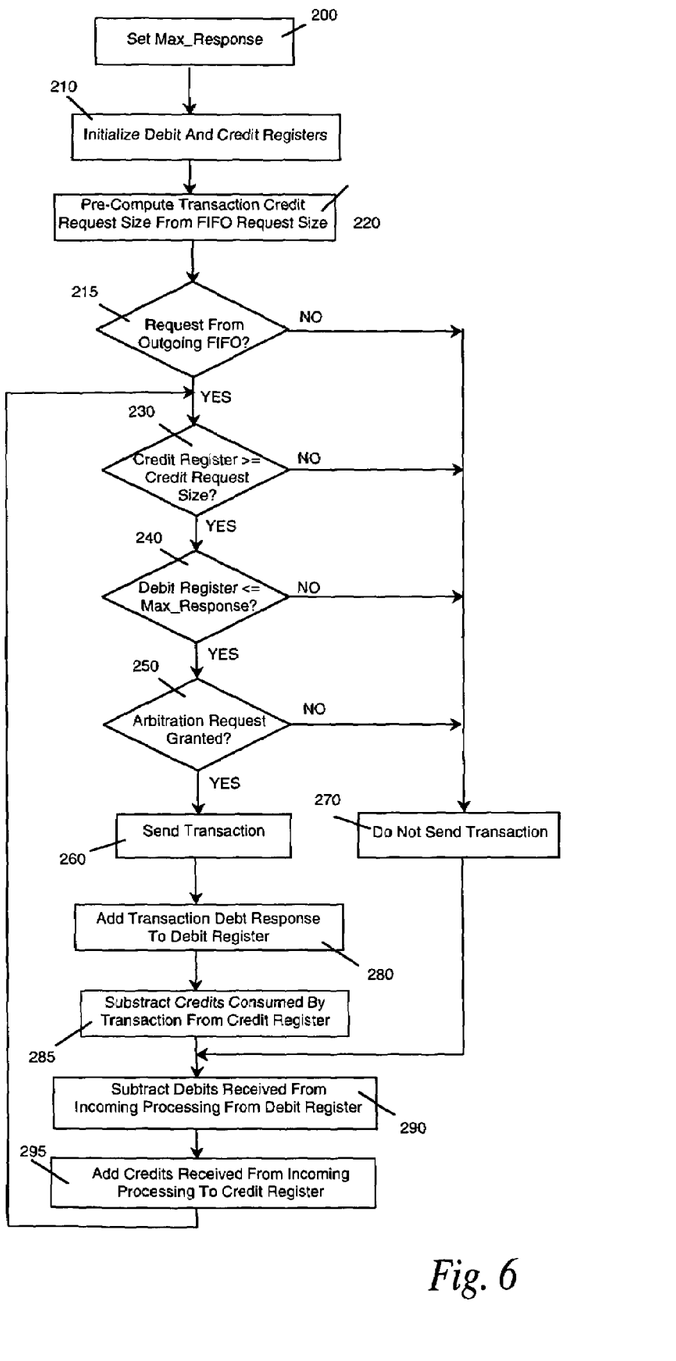
FIG. 6 is a flow chart showing the method of the present invention.

FIG. 6 is a flow chart of one operation of the method. The maximum response space allowed for each node or for each class within each node is set 200 as max_response. This represents the amount of space that is reserved for requests' responses in the remote node. The debit and credit registers 430,410 are initialized 210, then the transaction's credit request size is precomputed 220. If the balance in the credit register is greater than or equal to the transaction's credit request size 230, then the balance in the debit register is compared 240 to the max_response value. If the debit register is less than or equal to the max_response value 240, then the arbitration unit determines 250 whether to grant a request. If an arbitration request is granted 250 then the transaction is sent 260. If an arbitration request is not granted 250, or if the debit register value exceeds max_response 240, or if the credit register balance is less than the credit request size 230, or, then no transaction is sent 270.

In an alternative embodiment, the system 10 might not track returning debits 306, but instead might treat the problem by using a time reference. For instance, a particular number of debits might be subtracted from the debit register every clock cycle, based upon an estimated or average number of transactions processed during a particular time frame. Under this method, the debit register would not be allowed to have a balance less than zero.

The system then adjusts the registers to reflect credits and debits used by a transaction or restored by completed transactions. If a transaction was sent, the response debit is added to the debit register 280 and the credits consumed by the transaction are subtracted from the credit register 285. Regardless of whether or not a transaction was sent, any debits received from incoming processing are subtracted from the debit register 290 and any credits received from incoming processing are added to the credit register 295.

Although the present invention has been described in detail with reference to certain embodiments thereof, variations are possible. The present invention may be embodied in other specific forms without departing from the essential spirit or attributes thereof. In particular, the invention may be implemented throughout a whole system, or only part thereof. It may be selectively implemented between particular nodes or particular flow-control classes. It is desired that the embodiments described herein be considered in all respects as illustrative, not restrictive, and that reference be made to the appended claims for determining the scope of the invention.

I claim:

1. A method for improving system performance through remote credit management comprising:
    allocating a maximum response debit for responses within a flow control class to pending transactions between a source node and a destination node wherein the flow control class has an initial allocation of debits and credits which change with the issuance of the pending transactions;
    calculating an aggregate debit response value;
    determining whether sufficient debit space exists to process a transaction by comparing the aggregate debit response value to the maximum debit response space;
    and if sufficient debit space exists, allowing processing of the transaction.

2. The method of claim 1, wherein the step of calculating the aggregate debit response value comprises:
    computing a transaction debit response space required for the transaction; and
    adding the transaction debit response space to the sum of amounts of response space used by a plurality of pending request transactions in the source node.

3. The method of claim 1, further comprising:
    if the transaction is processed, computing a transaction debit response space required for the transaction; and
    adding the transaction debit response space to the aggregate debit response value; and
    if a pending transaction is completed, receiving a released debit response value after the completed pending transaction; and
    subtracting the released debit response value from the aggregate debit response value.

4. The method of claim 3, further comprising
    setting a credit request value for requests for transactions between the source node and the destination node;
    receiving a transaction request;
    pre-computing a number of credits required for the transaction;
    determining whether sufficient credit space exists to process the transaction;
    and if sufficient space credit space exists, processing the transaction.

5. The method of claim 4, wherein transactions occur in another direction, further comprising:
    subtracting the transaction credit request space from the credit request value;
    and if a received transaction in the other direction contains credits released by the receiver, receiving a released credit transaction response value after the completed transaction; and adding the released credits to the credit request value.

6. The method of claim 3, further comprising receiving a released credit transaction response value into an incoming packet processing unit; and delivering the released credit transaction response value to an outgoing packet processing unit.

7. The method of claim 1, further comprising subtracting a number of debits from the aggregate debit response value at a time interval.

8. A method for improving performance of a system having a first and second interconnected nodes comprising:
    assigning a debit value to a response within a flow control class for a transaction between the first and second nodes, said debit value being based upon the amount of space consumed by the response wherein the flow control class has an initial allocation of debits and credits which change with the issuance of the transaction;
    using a debit register to hold an aggregate debit value corresponding to an aggregate of debit values from at least one pending transaction;
    allocating a maximum debit value to the first node;
    receiving a transaction request;
    determining whether the debit register is less than or equal to the maximum debit value; and
    if the debit register is less than or equal to the maximum debit value, approving the transaction for processing.

9. The method of claim 8, wherein a plurality of maximum debit values are allocated to a plurality of different flow control classes within the same node.

10. The method of claim 8, further comprising, if a transaction is processed, calculating the debit value for the transaction, and adding the debit value to the debit register.

11. The method of claim 10, further comprising receiving a released debit value from a completed transaction; and subtracting the released debit value from the debit register.

12. The method of claim 11, further comprising assigning a credit value to a request for a transaction between the first and second nodes, said credit value being based upon the amount of space required to send a transaction;
    using a credit register to hold the credit value;
    computing a credit transaction size of a requested transaction;
    if the credit transaction size is less than the credit register, processing the transaction; and
    subtracting the credit transaction size from the credit register.

13. The method of claim 10, further comprising subtracting a number of debits from the debit register on time increments.

14. A computer system comprising:
- a source node; and
- a destination node connected to the source node by an interconnect structure, wherein the source node is allocated a maximum amount of debit space for responses within a flow control class to pending transactions wherein the flow control class has an initial allocation of debits and credits which change with the issuance of the pending transactions, and
- wherein the source node determines whether sufficient space exists to process a new transaction; and, if sufficient space exists, sends the new transaction to the destination node.

15. The computer system of claim 14, further comprising:
- an outgoing packet processing unit contained within the source node, wherein the outgoing packet processing unit receives a request for a transaction, determines whether sufficient space exists to process the transaction, and
- if sufficient space exists, sends an outgoing data packet to the destination node.

16. The computer system of claim 15, further comprising a debit register that holds a response debit value of an amount of space consumed by a response to a pending transaction, and a comparator that compares the debit register with the maximum amount of debit space.

17. The computer system of claim 14, further comprising:
- an output FIFO unloader connected to the outgoing packet processing unit, which output FIFO unloader controls the sending of the outgoing data packet;
- an arbitration unit that receives a transaction request signal, said arbitration unit being connected to the outgoing FIFO unloader that determines whether a particular transaction will be processed; and
- a credit unit that stores the response debit value, said credit unit being connected to the arbitration unit and to the outgoing FIFO unloader.

18. The computer system of claim 17, wherein the credit unit receives a transaction size corresponding to the debit size of a transaction, and wherein the credit unit receives a debit value after a completed transaction, and wherein the debit register is incremented when a transaction requiring a response is allowed for processing and is decremented when a pending transaction is completed.

19. The computer system of claim 17, wherein the debit register is decremented by a number of debits at a time interval.

20. The computer system of claim 15, wherein the destination node is allocated a maximum amount of credit space for sending transactions, and wherein the source node determines whether sufficient credit space exists to process a new transaction by comparing an amount of available credit space with the credit space required to process a new transaction; and further comprising an incoming credit packet processing unit that receives an incoming data packet from a destination node, and delivers credits and debit responses from the destination node to the outgoing packet processing unit when a transaction is completed; and
- an incoming FIFO unloader that releases credits back to the destination node when a transaction is completed.

* * * * *

UNITED STATES PATENT AND TRADEMARK OFFICE
CERTIFICATE OF CORRECTION

PATENT NO. : 7,103,672 B1
APPLICATION NO. : 09/562308
DATED : September 5, 2006
INVENTOR(S) : Debendra Das Sharma It is certified that error appears in the above-identified patent and that said Letters Patent is hereby corrected as shown below:

In column 4, line 50, delete "8" before "packet".

In column 5, line 27, delete "9" before "incoming".

Signed and Sealed this

Twelfth Day of January, 2010

David J. Kappos
*Director of the United States Patent and Trademark Office*